(12) United States Patent
Han et al.

(10) Patent No.: US 11,284,765 B2
(45) Date of Patent: Mar. 29, 2022

(54) ROBOT

(71) Applicant: LG ELECTRONICS INC., Seoul (KR)

(72) Inventors: Jaehun Han, Seoul (KR); Jiwoo Ha, Seoul (KR); Hyunsup Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/419,814

(22) Filed: May 22, 2019

(65) Prior Publication Data
US 2019/0380552 A1 Dec. 19, 2019

(30) Foreign Application Priority Data
Jun. 15, 2018 (KR) .................. 10-2018-0069117

(51) Int. Cl.
*A47L 9/28* (2006.01)
*B25J 9/00* (2006.01)
(Continued)

(52) U.S. Cl.
CPC ........... *A47L 9/2873* (2013.01); *B25J 9/0003* (2013.01); *B25J 9/1697* (2013.01);
(Continued)

(58) Field of Classification Search
CPC ............ A47L 9/2873; A47L 2201/04; A47L 2201/022; A47L 2201/06; G05D 1/0225; B25J 9/0003; B25J 9/1697; B25J 5/007; B25J 19/005; B25J 11/008; B25J 9/0009; Y02T 90/12; Y02T 10/7072; Y02T 10/70; B60L 3/0092; B60L 53/30
(Continued)

(56) References Cited

U.S. PATENT DOCUMENTS

| 2004/0201361 | A1 | 10/2004 | Koh et al. |
| 2005/0083011 | A1* | 4/2005 | Yang .................. H01R 13/2421 320/107 |

(Continued)

FOREIGN PATENT DOCUMENTS

| JP | 2006-239797 | 9/2006 |
| JP | 2009-061530 | 3/2009 |

(Continued)

OTHER PUBLICATIONS

Korean Notice of Allowance dated Jun. 1, 2020 issued in KR Application No. 10-2018-0069117.
(Continued)

*Primary Examiner* — B M M Hannan
(74) *Attorney, Agent, or Firm* — Ked & Associates, LLP (57) ABSTRACT

A robot according to an embodiment may include: a plurality of wheels, a motor to drive one or more of the wheels; a supporting plate to which the plurality of wheels are coupled; and a charging module coupled to the front end of the supporting plate. The charging module may include a terminal providing an electrical connection with a charging station when the robot docks with the charging station; and a housing providing an internal space, the terminal rotating or moving vertically in the internal space when the robot docks with the charging station.

19 Claims, 6 Drawing Sheets

(51) Int. Cl.
  *B25J 9/16* (2006.01)
  *G05D 1/02* (2020.01)
(52) U.S. Cl.
  CPC ...... *G05D 1/0225* (2013.01); *A47L 2201/022* (2013.01); *A47L 2201/04* (2013.01); *A47L 2201/06* (2013.01)
(58) Field of Classification Search
  USPC .......................................................... 320/107
  See application file for complete search history.

(56) References Cited

U.S. PATENT DOCUMENTS

| | | | | |
|---|---|---|---|---|
| 2007/0192910 A1* | 8/2007 | Vu | ............................ | B25J 19/06 700/245 |
| 2008/0155768 A1* | 7/2008 | Ziegler | ............... | A47L 11/4044 15/4 |
| 2008/0174268 A1* | 7/2008 | Koo | ....................... | A47L 9/2852 320/109 |
| 2009/0049640 A1* | 2/2009 | Lee | ........................... | A47L 9/20 15/319 |
| 2012/0116588 A1* | 5/2012 | Lee | ....................... | G05D 1/0255 700/259 |
| 2012/0143428 A1* | 6/2012 | Kim | ....................... | A47L 9/2852 701/23 |
| 2012/0242279 A1* | 9/2012 | Tso | ........................ | A47L 9/2868 320/107 |
| 2013/0138246 A1* | 5/2013 | Gutmann | ............. | G05D 1/0274 700/253 |
| 2014/0150820 A1* | 6/2014 | Yoo | ....................... | A47L 9/0633 134/6 |
| 2016/0206164 A1* | 7/2016 | Oka | ........................... | A47L 5/30 |
| 2016/0332526 A1* | 11/2016 | Svensson | ............... | H02J 7/0045 |
| 2016/0374528 A1* | 12/2016 | Morin | .................... | A47L 9/2842 15/319 |
| 2017/0102709 A1* | 4/2017 | Kwak | .................... | A47L 9/2847 |
| 2017/0113342 A1* | 4/2017 | Abramson | ............ | G05D 1/0246 |
| 2017/0150862 A1* | 6/2017 | Machida | ..................... | A47L 9/28 |
| 2017/0245714 A1* | 8/2017 | Son | ......................... | A47L 9/0081 |
| 2017/0273529 A1* | 9/2017 | Chung | ..................... | A47L 5/362 |
| 2017/0273532 A1* | 9/2017 | Machida | ..................... | A47L 5/22 |
| 2017/0324259 A1* | 11/2017 | Jung | ..................... | H02J 7/0045 |
| 2017/0332868 A1* | 11/2017 | Nam | .......................... | A47L 9/04 |
| 2018/0049613 A1* | 2/2018 | Tsuboi | ................. | G05D 1/0255 |
| 2018/0178390 A1* | 6/2018 | Yang | ...................... | B25J 9/0009 |
| 2018/0199776 A1* | 7/2018 | Sato | ...................... | A47L 9/1633 |
| 2018/0263447 A1* | 9/2018 | Yim | ...................... | A47L 9/2852 |
| 2018/0292837 A1* | 10/2018 | Chen | ...................... | G05D 1/024 |
| 2019/0059680 A1* | 2/2019 | Fox | ...................... | A47L 11/4005 |
| 2019/0307061 A1* | 10/2019 | Hong | ................... | A01D 34/736 |

FOREIGN PATENT DOCUMENTS

| | | |
|---|---|---|
| JP | 4418381 | 2/2010 |
| KR | 10-0488524 | 5/2005 |
| KR | 20-0394966 | 9/2005 |
| KR | 10-2008-0060535 | 7/2008 |
| KR | 10-2010-0066134 | 6/2010 |
| KR | 10-1193610 | 10/2012 |
| KR | 10-1324503 | 11/2013 |
| KR | 10-1428846 | 8/2014 |

OTHER PUBLICATIONS

Korean Office Action dated Dec. 12, 2019 issued in KR Application No. 10-2018-0069117.
International Search Report dated Jul. 5, 2019 issued in International Application No. PCT/KR2019/004017.

* cited by examiner

ROBOT

CROSS-REFERENCE TO RELATED APPLICATION

This application claims priority under 35 U.S.C. § 119 to Korean Application No. 10-2018-0069117 filed on Jun. 15, 2018, whose entire disclosure is hereby incorporated by reference.

BACKGROUND

1. Field

The present disclosure relates to a robot, and more particularly to a charging module of the robot.

2. Background

Robots may be used in various applications. For example, robots may have various functions in industry, medicine, and in space or deep sea environments. For example, a robot may repeatedly perform tasks in industrial settings, such as the manufacturing of vehicles. Furthermore, robots may perform various services. When providing a function or service, a robot may move various distances while carrying a load.

Korean Patent No. KR10-1193610B1 (entitled Traffic Guidance Intelligence Robot System at Crosswalk, and granted on Oct. 26, 2012) provides a guidance robot that can be charged when a battery providing power is discharged. For charging, the guidance robot can be used with a charging device, and the charging device may be referred to as a "charging bed" or a "charging station".

Korean Patent No. KR10-1428846B1 (entitled Charging Device of Robot Cleaner, and granted on Aug. 14, 2014) describes a charging device of a robot that includes an induction signal generation unit that outputs a return induction signal to the robot and an induction signal guidance member that is disposed at a side of the induction signal generation unit and guides docking of the robot. An elastic member disposed in the charging device is configured to push a terminal of the charging device to come in contact with a power terminal of the robot that has finished docking.

However, in these and other robot charging devices, the robot is often positioned on the charging device to be charged, and the charging bed may be damaged and broken due to a weight of the robot. Furthermore, as the robot moves to the charging device, a poor contact or other electrical connection between the charging device and the robot may occur due to the traveling of the robot, the relative positioning of the charging device and the robot, and the traveling direction of the robot. Furthermore, charging may fail due to an unstable connection between the robot and charging device. Furthermore, the robot may apply a force to the charging device due to a traveling inertia when the robot contacts the charging device, and this force may cause the charging device to fall over or may disrupt a charging connection between the robot and charging device.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
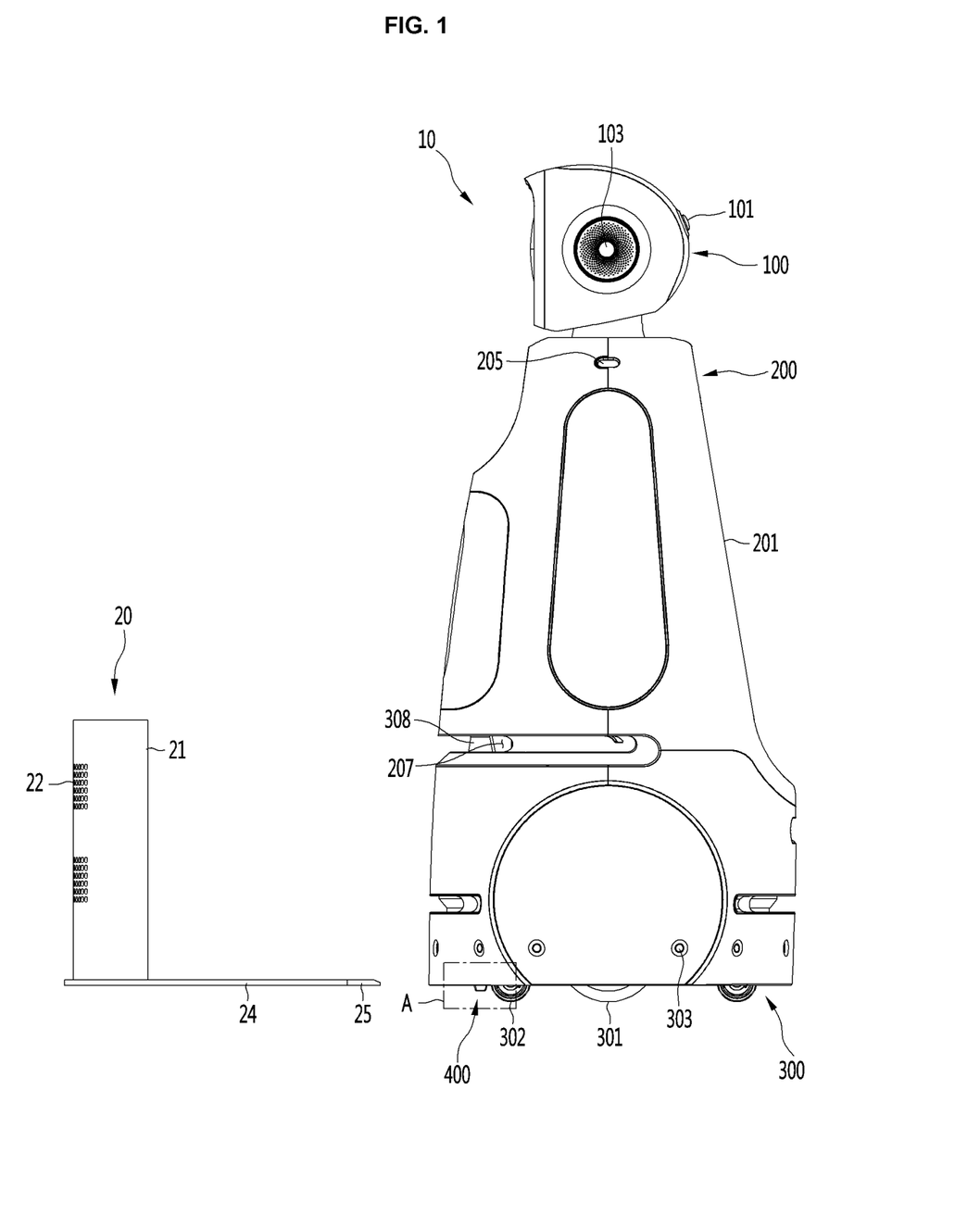
FIG. 1 is a view showing a robot and a charging station according to an embodiment of the present disclosure.
Figure 2:
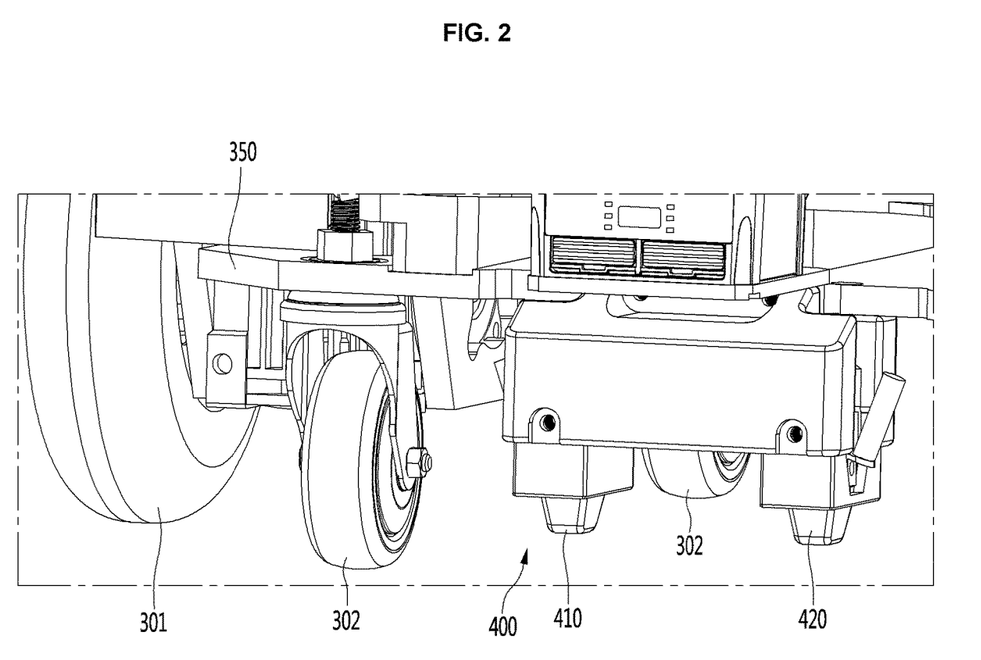
FIG. 2 is a view showing a charging module in the robot in FIG. 1 according to an embodiment of the present disclosure.

Referring to FIGS. 1 and 2, a robot (also referred to as a guidance robot) 10 according to an embodiment of the present disclosure may include a head 100, a body 200 disposed under the head 100, and a driving unit 300 disposed under the body 200. The robot 10 may perform various functions and services. For example, as described below, the robot 10 in certain embodiments may perform guidance services, such as providing information identifying a movement path to a user and/or moving along the movement path to guide a following user. It should be appreciated, however, that the robot 10 may perform other tasks or services. The robot 10 may include the head 100, the body 200, and the driving unit 300 to provide an external appearance similar to that of a human body. In other examples, the head 100 and the body 200 may be combined into a single component or the head 100 may be omitted from the robot 10.

The robot 10 may connect (e.g., establish an electrical connection) with a charging station 20 for charging the robot 10. For example, the driving unit 300 may detect or otherwise recognize a position of the charging station 20 and can bring the robot 10 and the charging station 20 in contact with each other by traveling to the recognized position.

The charging station 20 may provide power for charging the robot 10. For example, when a charging module 400 on the robot 10 is connected (e.g., positioned to be electrically connected) to the charging station 20, the robot 10 may be charged with the power provided from the charging station 20.

The robot 10 can be selectively connected to the charging station 20 for charging. Accordingly, the charging station 20 may be understood as a component that is separately provided from the robot 10 for charging the robot 10.

The head 100 may be coupled to a frame extending upward from an inside of the body 200. The frame coupled to the head 100 may form the "neck" of the robot 10. The body 200 may be seated on and coupled to a top surface of the driving unit 300.

The head 100 may include a head display (not shown) disposed on the front surface to output light, such as to provide visual information while facing a user; a speaker 103 providing audio output voice. In one example, the head 100 may optionally include an emergency button 101 or other user input device, and operation of the emergency button 101 may cause the robot 10 to perform braking in an emergency.

The speaker 103 may be disposed on both sides of the head 100 to provide an appearance of human body. For example, the speakers 103 may be positioned to provide an appearance of ears on the head 100. The speakers 103 can output audio content, such as a voice data. For example, the speakers 103 may output voice data related to performing a function of informing a user of airport-related information.

The emergency button 101 performs a function related to immediately stopping an operation while the robot 10 is stopped or travels. For example, the emergency button 101 can cause power to the robot 10 to be cut off when the emergency button 101 is pressed by a user. In one example, the emergency button 101 may be disposed behind the head display (not shown).

Further, the head 100 can turn to face a user by recognizing the position of the user. The head 100 may include a sensor for obtaining the position of a user or a face image. For example, the sensor may include Red, Green, Blue, and Distance (RGB-D) sensors (not shown) that capture an image of a user in different ranges of visual light or other electromagnetic radiations ranges (e.g., infrared, ultraviolet, etc.) and uses the image to determine a position of the user.

In one implementation, the body 200 may include various sensor and/or output devices. For example, the body 200 may include a display unit (or display) 201, a barcode reader 203, and a camera 205 on the shoulder of the robot 10 to collect visual data regarding the surrounding environment.

The display unit 201 may include a flat panel display or other display device. For example, the display unit 201 may outputs visual information related to the service that is being provided (e.g., airport gate inquiry information and course guide service information).

In one example, the display unit 201 may be positioned on a rear surface of the robot 10. The display unit 201 may be formed to extend vertically on the rear surface of the body 200. For example, the display unit 201 may be positioned on the rear surface and opposite to the traveling direction to provide information to a user while the user is walking to follow the moving robot 10. In this configuration, a user can see the display unit 201 disposed on the rear of the robot 10 while following the robot 10. Accordingly, various items of information (e.g., airport or flight information) can be provided to the user through the display unit 201 while the user is following the robot 10.

The barcode reader 203 can scan or recognize barcodes or other symbols that are provided from a passport, an airline ticket, a mobile, etc. of a user. Information obtained through the barcode reader 203 can be displayed on the display unit 201. The barcode reader 203 may be positioned to detect a barcode from the user when the user is following the robot 10. For example, the barcode reader 203 may be provided over the display unit 201 on the rear surface.

For example, a user can put a device screen displaying a barcode or a printed barcode (e.g., from a ticket or conformation message) in front of the barcode reader 203. When the barcode reader 203 recognizes a barcode, a gate to which the user is supposed to go can be displayed and guided on the basis of the information obtained from the barcode via the display 201.

The camera (also referred to as a shoulder camera) 205 may be positioned at a shoulder or other portion of the robot 10. For example, the camera 205 may be used to detect a current position of the robot 10 by photographing the surrounding environment. The camera 205 may be positioned at a shoulder or other portion of the robot 10 so that the camera 205 may capture images of a surrounding environment without being blocked by a user or other people near the robot 10. For example, the shoulder camera 205 may include a two dimensional (2D) camera that captures 2D images and recognize people or objects on the basis of 2D images. In another example, the shoulder camera 205 may capture a three-dimensional (3D) image and can measure the distance between the robot 10 and an object or person based on the obtained 3D image. Furthermore, the shoulder camera 205 can be used to detect a location of obstacles so that collisions between the robot 10 and the obstacle can be avoided.

The body 200 may further include a front light detection and ranging (lidar) groove 207 formed at a lower end of the body 200 so that a front lidar 308 (see FIG. 6) can operate. The front lidar groove 207 may be formed at the lower end of the front surface of the body 200. For example, the front lidar groove 207 may be formed at the front end of the lower portion of the body 200 to make a semicircular arc.

The front lidar 308 can be exposed to the outside of the robot 10 via the front lidar groove 207. The front lidar 308 can recognize a position, for example, by radiating a laser beam and collecting and analyzing a reflection to identify, for example, dispersion or absorption of the light. It should be appreciated that the robot 10 may include other types of sensors to collected information regarding a surrounding environment and/or a location of the charging station 20.

The driving unit 300 can drive the robot 10 by providing a driving force. The driving unit 300 may include a battery (not shown) providing power, a plurality of sensors 303, and a plurality of wheels 301 and 302 that performs a rolling motion.

The battery (not shown) may be disposed in the internal space of the driving unit 303. The battery may include a lithium ion (Li-ion battery) and/or other type of battery. As described below, the battery can be charged through contact of the robot 10 with the charging station 20.

The sensors 303 may include ultrasonic sensors 303. The ultrasonic sensors 303 can sense the distance between an obstacle and the robot 10 by emitting an ultrasonic signal and then detecting a reflection (or echo) of the ultrasonic signal from the obstacle.

The wheels may be disposed in a case forming the external appearance of the driving unit 300. The wheels may include a main wheel (or driving wheel) 301 connected with a motor (not shown) that provides a driving force to rotate the main wheel 301, and an assistant wheel (or driven wheel) 302 that does not receive a driving force from the motor and, instead, moves depending on movement of the main wheel 301 or due to external force (e.g., a push by a user). For example, the assistant wheel 302 may include a caster.

In one configuration, the main wheel 301 may be disposed on opposite (e.g., left and right) sides of the driving unit 300. For example, the main wheel 301 may be disposed at the centers of the lower ends of the left and right sides of the driving unit 300. The assistant wheel 302 may be disposed ahead of and behind the main wheel 302.

As described below, the wheels 301 and 302 may be disposed behind the charging module 400. In particular, the foremost assistant wheel 302 of the wheels may be disposed behind the charging module 400. The robot 10 may approach the charging station 20 until the assistant wheel 302 comes in contact with the charging station 20, and the charging module 400 can come in contact with the charging station 20 earlier than the wheels 301 and 302 (see FIG. 6).

The driving unit 300 may further include a plurality of rear lidar grooves formed at the rear side of the driving unit 200 to provide openings that enable rear lidars (not shown) to operate. The rear lidars may be exposed to the outside by the rear lidar grooves. The rear lidars, similar to the front lidar 308, can recognize a position by radiating a laser beam and collecting and analyzing reflected light.

The driving unit 300 may further include a supporting plate 350 (see FIG. 2) that supports the main wheel 301 and the assistant wheel 302. For example, the supporting plate 350 may be rigid plate to which the main wheel 301 and the assistant wheel 302 are coupled. The supporting plate 350 may be disposed at the lower end in the driving unit 300. The main wheel 301 and the assistant wheel 302 may be coupled to the bottom of the supporting plate 350, and the battery and a plurality of electric parts may be disposed over the supporting plate 350.

The driving unit 300 may further include the charging module 400 for charging. The charging module 400 may be disposed at the front end of the supporting plate 350. For example, the charging module 400 may be coupled substantially at a center of the front surface of the supporting plate 350.

The charging module 400 may protrude downward from the lower end of the case forming the external appearance of the driving unit 300. The charging module 400 may be spaced upward apart from the ground. That is, the lower end of the charging module 400 may be disposed between the ground and the lower end of the case of the driving unit 300.

The charging module 400 may include terminals 410 and 420 that are configured to contact the charging station 20 when the robot 10 dockets into the charging station 20. The terminals 410,420 may protrude downward from the lower end of the case of the driving unit 300. Accordingly, the terminals 410 and 420 may be disposed to come in contact with a terminal connecting portion (or terminal connection region) 25 of the charging station 20 when the robot 10 travels toward the charging station 20 from the rear area of the charging station 20.

The robot 10 may dock with the charging station 20 for charging when the battery is discharged. The charging station 20 may include an installation plate 24 supported on the ground and a charging case 21 extending upward from the installation plate 24.

The installation plate 24 may have a vertical width that is smaller than the vertical distance between the ground and the lower end of the case of the driving unit 300. That is, the installation plate 24 may be formed such that the case of the driving unit 300 can move in a front-rear direction on the installation plate 24 without interference.

Figure 6:
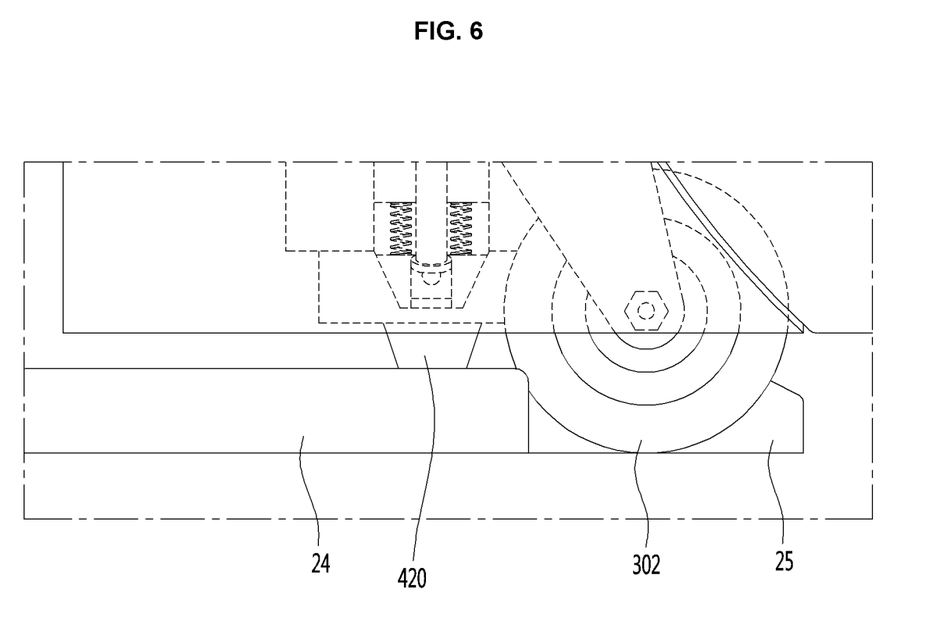
FIG. 6 is a view showing the robot connected with the charging station according to an embodiment of the present disclosure.

A gap space may be defined between the lower end of the case of the driving unit 300 and the top surface of the installation plate 24 (see FIG. 6). The gap space may be understood as space where the terminals 410 and 420 are disposed when the robot 10 is docking into the charging station 20. For example, the vertical width of the installation plate 24 may be smaller than the radius of the assistant wheel 302.

At least one electric part (or circuitry) that provides power to the terminal connecting portion 25 to charge the docked robot 10 may be provided in the charging case 21. A plurality of heat dissipation holes 22 for dissipating heat may be formed at the charging case 21.

Referring to FIG. 1, the robot 10 can approach the charging station 20 for charging from a rear area of the charging station 20 (e.g., an area where the installation plate 24 and the terminal connecting portion 25 are located). The rear portion of the charging station 20 may be disposed to face the robot 10 when docking, and the heat dissipation holes 22 may be formed on the front surface of the charging case 21 with respect to the robot 10 (e.g., opposite to the robot 10).

In the following description, the direction in which the charging station 20 faces the robot 10 is defined as a rearward direction and the opposite direction is defined at a forward direction. For example, the front and rear directions for the charging station may be defined with respect to the robot 10. For example, the charging case 21 may be formed to extend upward from the front end of the installation plate 24.

The charging station 20 may further include the terminal connecting portion 25 that comes in contact with or connects with the charging module 400 when the robot 10 docks in the charging station 20. The terminal connecting portion 25 may function as a switch that transmits power provided from the electric part disposed in the charging case 21 to the charging module 400. In one implementation, the terminal connecting portion 25 may transmit power for charging the battery when brought into in contact with the terminals 410 and 420 of the charging module 400.

The terminal connecting portion 25 may be disposed at the rear end of the installation plate 24. The terminal connecting portion 25 may extend rearward from the center of the rear surface of the installation plate 24. For example, the terminal connecting portion 25 may protrude from the installation plate 24.

In one configuration described below, the terminal connecting portion 25 may extend rearward (e.g., in a direction away from charging case 20) from the rear surface of the installation plate 24, and the terminal connecting portion 25 may have a width that is less than a width of the rear surface of the installation plate 24. According to the protrusive structure of the terminal connecting portion 25, even when the charging module 400 of the robot 10 is seated on the terminal connecting portion 25, the wheels 301 and 302 may be supported on the ground so the charging station 20 does not need to support the load of the robot 10.

Figure 3:
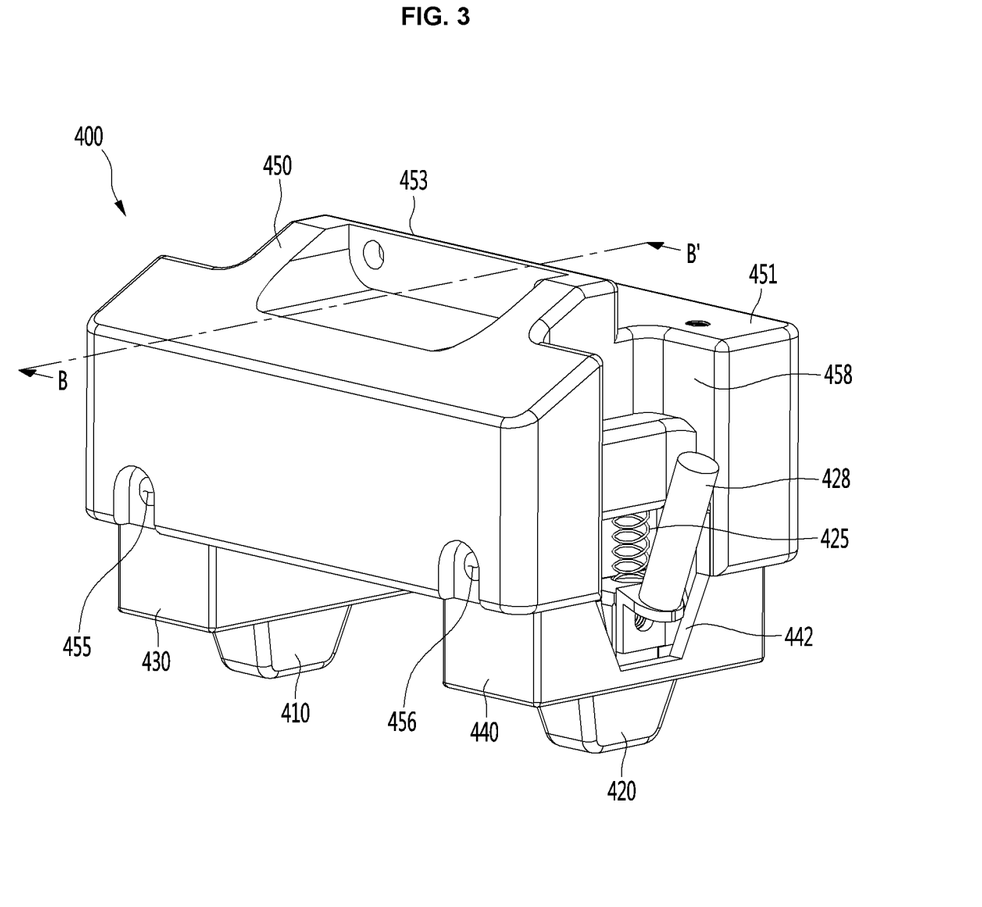
FIG. 3 is a view showing the charging module according to an embodiment of the present disclosure.
Figure 4:
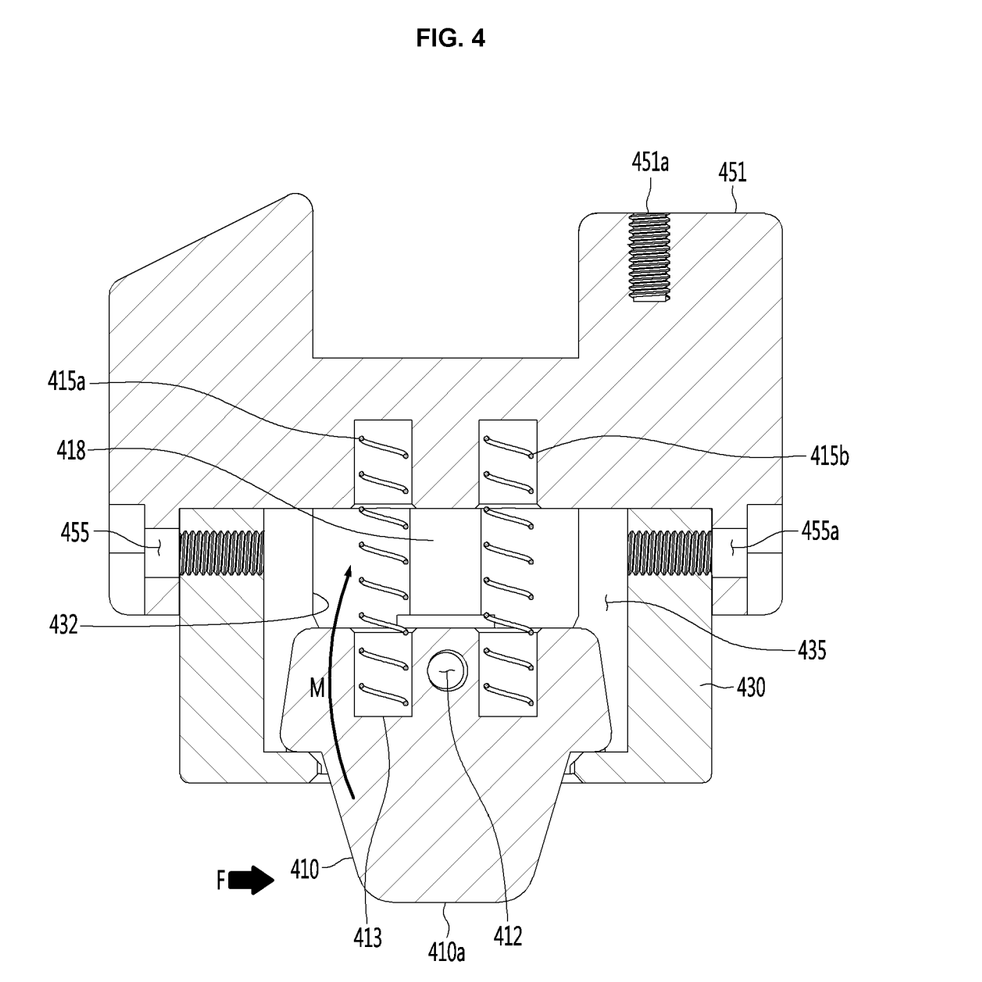
FIG. 4 is a view showing a cross-section view of the charging module of FIG. 3 along line B-B'.

FIG. 3 is a view showing the charging module according to an embodiment of the present disclosure and FIG. 4 is a view showing a B-B' cross-section of FIG. 3. Referring to FIGS. 3 and 4, the charging module 400 may include the terminals 410 and 420 that can receive power by contacting or otherwise connecting to the terminal connecting portion 25. The terminals 410 and 420 may include a first terminal 410 and a second terminal 420 spaced apart from the first terminal 410. For example, the second terminal 420 may be laterally spaced apart from the first terminal 410. The first terminal 410 and the second terminal 420 may be formed to have a similar structure. Accordingly, the components described as being included in the first terminal 410 may also be included in the second terminal 420.

The first terminal 410 and the second terminal 420 may each include a connecting surface 410a that corresponds to a bottom surface. The connecting surface 410a may be seated on or may come in contact with a top surface of the terminal connecting portion 25 when the robot 10 is docked in the charging station 20. Accordingly, the charging station 20 can electrically connect to the terminals 410 and 420 via the connecting surface 410a so that the robot 10 can be charged.

The first terminal 410 and the second terminal 420 may be formed to have a width that increases upward (e.g., away from the connecting surface 410a). For example, the front surface of the first terminal 410 may be inclined forward toward an upper end. Similarly, the rear surface of the second terminal 420 may be inclined rearward toward the upper end.

The first terminal 410 and the second terminal 420 may form protrusive ends that protrude in the front-rear direction to hang, respectively, in openings formed at the lower ends of terminal receiving portions (or lower terminal housing) 430 and 440. For example, the protrusive end of the first terminal 410 may be disposed at the upper portion of the first terminal 410. The protrusive ends may extend in the front-rear direction with widths larger than the width of the opening of the terminal receiving portions 430 and 440. Accordingly, the protrusive ends can be seated on inner bottom surfaces defining the openings of the terminal receiving portions 430 and 440 to prevent the first terminal 410 and the second terminal 420 from moving out of the openings of the terminal receiving portions 430 and 440.

Each of the first terminal 410 and the second terminal 420 may include an elastic hole 413 recessed downward from the top surface. A plurality of elastic holes 413 may be formed. An elastic member (or spring) 415, 425 may be inserted in the elastic hole 413. For example, the charging module 400 may further include an elastic member 415 that provides elastic force in accordance with a vertical movement of the first terminal 410 and an elastic member 425 that provides elastic force in accordance with a vertical movement of the second terminal 420 in the terminal receiving portions 430 and 440.

A plurality of elastic members 415, 425 may be provided to respectively correspond to the elastic holes 413 formed at the first terminal 410 and the second terminal 420. For example, two elastic holes 413 spaced apart from each other in the front-rear direction may be provided on the top surfaces of the terminals 410 and 420.

The elastic member 415 may include a front elastic member 415a and a rear elastic member 415b disposed behind the front elastic member 415a. The front elastic member 415a may be inserted in a first elastic hole 413 formed on the top surface of the terminal 410 and the rear elastic member 415b may be inserted in a second elastic hole formed behind the first elastic hole 413. For example, the lower portion of the elastic member 415 can be inserted in the elastic hole 413 of the terminals 410 and 420.

The upper portion of the elastic member 415 may be inserted in the lower end of a terminal cover (or an upper housing) 450. For example, the upper end of the elastic member 415 may be positioned to be inserted in a hole recessed upward from the bottom surface of the terminal cover 450.

Accordingly, the terminals 410 and 420 can receive elastic force from the elastic member 415 when the terminals 410 and 420 are rotated and/or moved up and down. For example, when the terminals 410 and 420 come into contact with the terminal connecting portion 25 and are moved up, the terminals 410 and 420 can receive elastic force from the elastic member(s) 415. Accordingly, when the terminal connecting portion 25 and the terminals 410 and 420 are disconnected, the terminals 410 and 420 can return to the initial positions due to the elastic force.

The charging module 400 may further include the terminal receiving portions (or lower terminal housing) 430 and 440 receiving the terminals 410 and 420. For example, the terminal receiving portions 430 and 440 may include a first terminal receiving portion (or first lower terminal housing) 430 in which the first terminal 410 is received and a second terminal receiving portion (or second lower terminal housing) 440 in which the second terminal 420 is received.

Openings may be formed on the bottom surfaces of the terminal receiving portions 430 and 440. Seating surfaces defining the openings and bending and extending inward along the lower ends of the terminal receiving portions 430 and 440 may be formed at the terminal receiving portions 430 and 440.

The protrusive ends of the terminals 410 and 420 may be seated and hang on the seating surface. For example, the seating surface may vertically extend inward along one or more of the four sides formed at the lower end of the terminals 410 and 420. The seating surface may form an opening through the terminals 410 and 420.

The terminals 410 and 420 may be inserted and positioned in the openings formed by the seating surface, that is, in the center spaces. Accordingly, the terminals 410 and 420 can move up and down. The terminals 410 and 420 may hang on the seating surface of the terminal receiving portions 430 and 440 by elastic force and gravity.

The connecting surface 410a may be disposed under the terminal receiving portions 430 and 440 and may be exposed toward the ground. For example, the terminal receiving portions 430 and 440 may have a hexahedral shape being open up and down. For example, the terminal receiving portions 430 and 440 can form an internal space 435 in which the terminals 410 and 420 can be seated, moved, or received. The terminals 410 and 420 are inserted in the internal space 435 and can move up and down.

The width of the inner sides of the terminal receiving portions 430 and 440 defining the internal space 435 may be larger than the width of the terminals 410 and 420. The vertical length of the inner sides of the terminal receiving portions 430 and 440 may be larger than the distance from the lower end of the protrusive ends to the upper end of the terminals 410 and 420. Accordingly, terminal 420 and 420 may be positioned such that the connecting surface 410a is exposed downward from the terminal receiving portions 430 and 440. In this configuration, when the robot 10 enters the charging station 20, the terminal connecting portion 25 and the connecting surface 410a can come in contact with each other.

When the connecting surface 410a comes in contact with the rear end of the terminal connecting portion 25, a pushing force F is applied to the lower ends of the terminals 410 and 420. For example, a traveling inertia may cause torque F that rotates (e.g., causes an end of the terminals 410 and 420 to move in a horizontal direction corresponding to force F) or causes a vertical movement of the terminals 410 and 420 when the robot 10 docks at the charging station 20.

For this reason, problems such as poor connection and damage may occur because it is difficult to forcibly connect a terminal and a terminal connecting portion at a correct position due to traveling inertia. Furthermore, the force F may cause robot to lose its balance and tip. Furthermore, a connection between a charging station and a robot may be inconsistent due to the torque.

However, the robot 10 according to an embodiment of the present disclosure can avoid these types of problems because the front-rear width of the internal space 435 is larger than the front-rear width of the terminals 410 and 420 and accordingly the terminals 410 and 420 can move up and down in the internal space 435 even while rotating. For example, the inner sides of the terminal receiving portions 430 and 440 defining the internal space 435 may be spaced a prescribed distance away from the upper portions (or the protrusive ends) of the terminals 410 and 420 inserted and positioned in the internal space 435 such that a gap remains between the terminals 410 and 420 and the internal space 435.

Thus a gap space may be formed between the inner sides of the terminal receiving portions 430 and 440 and the terminals 410 and 420, so the terminals 410 and 420 can more freely move when rotating because surfaces of the terminals 410 and 420 are in the gap space and not contacting the inner sides of the terminal receiving portions 430 and 440. For example, the terminal receiving portions 430 and 440 can provide the internal space 435 such that the terminals 410 and 420 can be smoothly pushed up while rotating by torque when force F from the terminal connecting portion 25 is applied to the lower ends of the terminals 410 and 420.

The terminals 410 and 420 can move upward (see an arrow M) while rotating in the internal space 435. For example, when the front surface of the terminals 410 and 420 and the terminal connecting portion 25 come in contact with each other, the lower ends of the terminals 410 and 420 are pushed rearward and rotated counterclockwise a predetermined angle and continuous force provided rearward by the terminal connecting portion 25 can move up the terminals 410 and 420.

When the terminals 410 and 420 are moved up, the elastic members 415 can compress to provide elastic force to the terminals 410 and 420. Accordingly, when the terminals 410 and 420 are positioned finally on the top surface of the terminal connecting portion 25, the terminals 410 and 420 can become horizontal by being rotated clockwise by the elastic force from the elastic members 415.

In this configuration, the elastic members 415 can provide force enabling the terminals 410 and 420 to stably maintain horizontality. Accordingly, the connecting surface 410a may stable come in contact with the top surface of the terminal connecting portion 25. When the connecting surface 410a is seated, comes in contact with, or connects with the top surface of the terminal connecting portion 25, it can maintain the correct position by the elasticity of the elastic members 415. As a result, the robot 10 according to an embodiment of the present disclosure can prevent a loss of balance and a danger of breakage of parts due to the torque.

The terminal receiving portions 430 and 440 may have cutting portions (or recess) 432 and 442 that are open to the outside. For example, the first terminal receiving portion 430 may be formed such that the side facing the second terminal receiving portion 440 is closed and the opposite side facing the outside is open by the first cutting portion 432. Similarly, the second terminal receiving portion 440 may be formed such that the side facing the first terminal receiving portion 430 is closed and the opposite side facing the outside is open by the second cutting portion 442.

The cutting portions 432 and 442 may be open vertically to avoid interference with a vertical movement of a terminal bridge 418, 428 to be described below. The charging module 400 may further include the terminal bridge 418, 428 for transmitting power received from the charging station 20 to electric parts to be charged, such as the battery. The terminal bridge 418, 428 may be coupled to the outer sides of the terminals 410 and 420.

A terminal coupling hole 412 that guides coupling of the terminal bridge 418 may be formed at the terminals 410 and 420. Accordingly, the terminal bridge 418 can be coupled to the terminals by fasteners (e.g., nail, screws, bolts, etc.) inserted in the terminal coupling holes 412.

The terminal bridge 418, 428 may extend to be inclined outward as it goes upward from the joint with the terminals 410 and 420. The terminal bridge 418 may move up and down as the terminals 410 and 420 move. Accordingly, the electric parts requiring to be charged can be electrically connected or disconnected by movement of the terminal bridge 418. As a result, the terminals 410 and 420 can move in the internal space 435 and can function as a switch that connects/disconnects power that is provided from the terminal connecting portion 25 and transmitted to the electric parts to be charged.

The terminal bridge 418 can be moved up and down by the cutting portions 432 and 442 and a cover recession (or cover recess) 458 of the terminal cover 450, to be describe below. The charging module 400 may further include the terminal cover 450 disposed over the receiving the terminal receiving portions 430 and 440. The terminal cover 450 may be formed to cover the open top surface of the terminal receiving portions 430 and 440.

The terminal cover 450 may have receiving portion coupling holes 455, 455a, and 456 for coupling to the terminal receiving portions 430 and 440. The receiving portion coupling holes 455, 455a, and 456 may include a first receiving portion coupling hole 455 that guides coupling to the first terminal 410, a rear receiving portion coupling hole 455a that guides coupling of the first terminal 410 in the opposite direction to the first receiving portion coupling hole 455, a second receiving portion coupling hole 456 that guides coupling to the second terminal 420, and a rear receiving portion coupling hole (not shown) that guides coupling of the second terminal 420 in the opposite direction to the second receiving portion coupling hole 456.

Holes corresponding to the receiving portion coupling holes 455, 455a, and 456 may be formed at the terminal receiving portions 430 and 440, and the terminal receiving portions 430 and 440 and the terminal cover 450 can be coupled by fasteners inserted in the receiving portion coupling holes 455, 455a, and 456.

The cover recession 458 providing a movement space for the terminal bridge 418 may be formed at the terminal cover 450. The cover recession 458 may be recessed inward on both sides of the terminal cover 450.

The terminal cover 450 may include a rear coupling portion (or rear coupling surface) 451 on which the supporting plate 350 is seated and a vertical coupling portion (or vertical coupling surface) 453 with which the front surface of the supporting plate 351 comes in contact, on the top surface thereof. The supporting plate 350 may be seated on the rear coupling portion 351, and rear coupling hole 451 may be formed at the rear coupling portion such that fasteners passing through the supporting plate 350 and the rear coupling portion 351 are inserted. The front end surface of the supporting plate 350 may be in contact with the vertical coupling portion 453, and a hole may be formed at the vertical coupling portion such that a fastener passing through the vertical coupling portion 453 and the front end surface of the support plate 350 is inserted.

Figure 5:
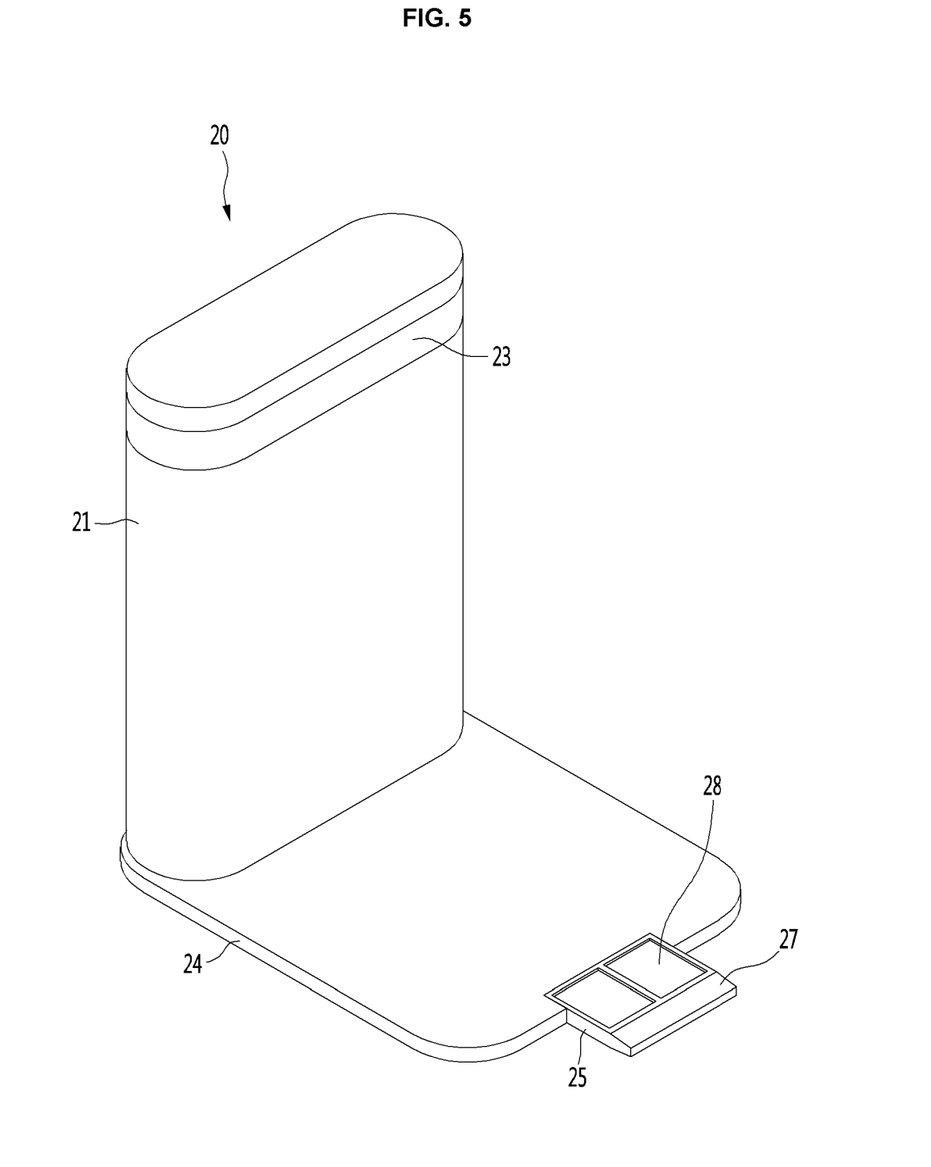
FIG. 5 is a view showing the charging station in FIG. 1 according to an embodiment of the present disclosure.

The configuration of the charging station 20 and a connection of the robot 10 and the charging station 20 are described with reference to FIGS. 5 and 6. The charging station 20 may further include a lidar reflective plate 23 that guides approach of the robot 10.

The front lidar 308 can recognize a position by radiating a laser beam toward the front of the robot 10 and collecting and analyzing light. Accordingly, the front lidar 308 can sense the position of the charging station 20 by recognizing light from the lidar reflective plate 23. The robot 10 can travel toward the charging station from the front area of the charging station 20.

The terminal connecting portion 25 may extend outward from a surface of the installation plate 24. For example, the terminal connecting portion 25 may extend rearward from the center of the rear surface of the installation plate 24. The distance between sides of the terminal connecting portion 25 may be smaller than the distance between sides of the installation plate 24. Additionally, the terminal connecting portion 25 may protrude from the center of the rear surface of the installation plate 24. Accordingly, the charging module 400 spaced a predetermined distance apart rearward from the front end of the driving unit 300 can be disposed on the top surface of the terminal connecting portion 25.

The robot 10 can move forward until the assistant wheel 320 comes in contact with the rear surface of the installation plate 24. The terminal connecting portion 25 can be inserted and positioned in the lower end of the robot 10.

The terminal connecting portion 25 may include a connection seating surface 28 that the terminals 410 and 420 of the charging module 400 contact. The connection seating surface 28 may be disposed on the top surface of the terminal connecting portion 25. For example, the connection seating surface 28 may be formed as a surface recessed by a predetermined length forward from the rear end of the terminal connecting portion 25.

The first terminal 410 and the second terminal 420 may be configured to be seated on the connection seating surface 28 when the robot 10 is docked in the charging station 20. For example, the connecting surface 410a of the first terminal 410 and the connecting surface of the second terminal 420 can be seated and electrically connected to each other on the connection seating surface 28.

As described above, the terminals 410 and 420 may have a front surface extending such that the width increases as it goes upward to the upper end from the connecting surface 410a. The front surfaces of the terminals 410 and 420 may be referred to as "inclined surfaces". An inclined guide (or inclined guide surface) 27 corresponding to the front incline of the terminals 410 and 420 may be formed at the rear end of the terminal connecting portion 25. The inclined guide 27 may be formed such that the height increases as it goes forward toward the charging case 21.

Accordingly, when the terminals 410 and 420 come in contact with the terminal connecting portion 25, the direction of force pushing up the terminals 410 and 420 changes in a direction inclined relatively upward, so the terminals 410 and 420 can be more smoothly moved. The torque value that is the horizontal component of the pushing force F of the terminal connecting portion 25 can be relative reduced by the inclined guide 27. Accordingly, the robot 10 can come in contact with the charging station 20 while stably maintaining the balance.

The robot 10 may approach the charging station 20 based on recognizing the position of the charging station 20 through the front lidar 308. The robot 10 can travel until the charging module 400, protruding downward from the robot 10, comes in contact with the terminal connecting portion 25. While the robot 10 moves to the charging station 20, the front end of the driving unit 300 can move forward to cover the upper portion of the terminal connecting portion 25.

The terminal 410 and 420 may be disposed lower than a front end of the driving unit 300 and can come into contact with the front end of the terminal connecting portion 25 when the robot 10 docks into the charging station 20. In the docking process, as described above, the pushing force F by the terminal connecting portion 25 may be applied to the lower ends of the terminals 410 and 420 due to the contact with the front end of the terminal connecting portion 25. For example, as the robot 10 approaches the charging station 20, a rear surface of the terminal connecting portion 25 can provide the pushing force F to the front surface of the terminals 410 and 420.

As described above, the front surfaces of the terminals 410 and 420 may be inclined forward as the terminals 410 and 420 extend upward toward the terminal receiving portions 430, 440. Accordingly, a portion of the horizontal (e.g., rearward) pushing force F, as applied to the inclined front surfaces of the terminals 410 and 420, is converted to a vertical (e.g., upward) component that is applied to the front surface of the terminals 410 and 420. Accordingly, the front surfaces of the terminals 410 and 420 are both slightly rotated rearward and moved upward while they come in sliding contact with the terminal connecting portion 25 such that the terminals 410 and 420 may rotate relative to the terminal receiving portions 430, 440.

The lower ends of the terminals 410 and 420 may be positioned on the top surface of the terminal connecting portion 25 by the upward movement of the terminals 410 and 420. For example, the connecting surface 410a can come in contact with the connection seating surface 28 formed on the top surface of the terminal connecting portion 25. In this configuration, the robot 10 can be electrically connected with the charging station 20. In one example, the robot 10 may stop traveling by controlling the motor (not shown) included in the travelling unit 300 based on recognizing the electrical connection between the connecting surface 410a and the connection seating surface 28 of the terminal connecting portion 25.

Even after the motor of the travelling unit 300 stops producing a driving force, the robot 10 may continue be pushed forward, toward the charging case 21, by inertia. Despite the forward inertial force, the assistant wheel 402 may be positioned to contact the rear end of the installation plate 24 and to arrest any further forward movement of the robot 10 toward the charging case (see FIG. 6). Accordingly, the robot 10 does not drive on the top surface of the installation plate 24 and can come to a complete stop to maintain the connection of the terminals 410 and 420 with the connection seating surface 28 of the terminal connecting portion 25. Therefore, the terminal connecting portion 25 is electrically connected with the terminals 410 and 420 seated on the top surface thereof, so the robot 10 can be changed while wheels 301, 302 support the robot 10 on the ground and away from the installation plate 24.

Aspects of the present disclosure provide a robot that can prevent danger of break of a charging station when the robot is charged. Another aspect of the present disclosure provides a robot that maintains stable connection between the robot and a charging station. Another aspect of the present disclosure provides a robot that can safely connect with a charging station.

In order to achieve these and other aspects of the present disclosure, a robot according to an embodiment of the present disclosure may include: a plurality of wheels connected to a motor and performing a rolling motion; a supporting plate supporting the plurality of wheels; and a charging module coupled to the front end of the supporting plate.

The charging module may include a terminal performing electrical connection; and a terminal receiving portion inserted in an internal space of the terminal. The charging module may be movable. In detail, the charging module may have a terminal coming in contact with a charging station and being movable up and down. The charging module may protrude downward from the lower end of a case forming an external appearance.

The charging module may be positioned such that inner surfaces defining the internal spaces are spaced away from the terminal in a front-rear direction. The terminal can move up while rotating in the internal space. The terminal may be moved upward while rotating by moment that is generated when it comes in contact with the charging station. That is, the terminal may be relatively more freely moved.

The charging module may further include a terminal cover coupled to the upper portion of the terminal receiving portion. The terminal cover may include a rear coupling portion on which the supporting plate is seated and coupled and a vertical coupling portion to which the front surface of the supporting plate is coupled.

A battery disposed on the supporting plate may further included. The charging module may further include a terminal bridge for electrical connection with the battery. The terminal cover may have cover recessions formed on both sides for movement spaces of the terminal bridge. The terminal bridge may be coupled to the outer side of the terminal. The terminal receiving portion may have a cutting portion such that the outer side is open upward.

The charging module may further include an elastic member inserted in the upper portion of the terminal and the lower portion of the terminal cover.

The terminal may extend such that the width increases as it goes upward. The terminal may further have a protrusive end protruding downward to hang on the terminal receiving portion. The terminal receiving portion may have a seating surface extending inward from the lower end to seat the protrusive end.

A charging station electrically connected with the charging module and charging the battery may be further included. The charging station may include an installation plate supported on the ground and a terminal connecting portion protruding from the installation plate. The terminal connecting portion may be electrically connected by seating the charging module thereon. The wheels supporting the load of the robot are characterized by hang on the front end of the charging station.

The terminal connecting portion may have an inclined guide that guides contact of the charging module. The charging station may further include: an installation case extending upward from the installation plate; and an electric part disposed in the installation case and providing power to the terminal connecting portion.

According to the robot according to an embodiment of the present disclosure, there are the following attributes. First, since the robot does not get on the charging station to be charged, it is possible to prevent parts from being damaged and broken. Second, since the charging station does not need to support the weight of the robot, the charging station and the robot can be protected during charging. Third, it is possible to structurally prevent the problem that the robot forcibly gets on the charging station due to a wrong position of the charging station generated by force by the traveling speed component of the robot. That is, stability of the robot can be improved. Fourth, it is possible to improve electrical connection ability and accuracy between the charging station and the robot. Fifth, when the charging module of the robot can stably connect to the charging station when it comes in contact with the charging station, so the success ratio of charging can be improved.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a support plate;
a plurality of wheels coupled to the support plate, at least one of the wheels rotating based on receiving a driving force to move the robot; and
a charging module coupled to a front end of the support plate,
wherein the charging module includes:
an upper housing coupled to the support plate;
a lower housing coupled to a lower region of the upper housing and having an internal space that opens downward, and
a terminal inserted into the internal space of the lower housing so that a portion of the terminal is exposed to an exterior of the robot below the lower housing, the terminal being configured to receive electrical energy from a charging station, and
wherein a width of the internal space of the lower housing is greater than a width of the terminal in order for the terminal to selectively rotate and move vertically relative to the lower housing in the internal space of the lower housing.

2. The robot of claim 1, wherein lower housing includes one or more inner surfaces defining the internal space, and the inner surfaces are spaced away from the terminal in a horizontal direction.

3. The robot of claim 2, wherein the terminal moves up while rotating in the internal spaces when the robot is docking in the charging station.

4. The robot of claim 1, wherein:
an opening is formed on a bottom surface of the lower housing,
the terminal is positioned to pass through the opening, and
the terminal has an upper end positioned in the internal space, the upper end protruding in at least one horizontal direction to have a width greater than a width of the opening in the horizontal direction so that the upper end does not pass through the opening.

5. The robot of claim 1, wherein a front surface of the terminal is inclined forward from a lower end of the front surface.

6. The robot of claim 1, wherein the charging module further includes a terminal bridge that selectively passes the electrical energy receive by the terminal from the charging station.

7. The robot of claim 6, wherein the upper housing includes a recess formed on a side surface, and a portion of the terminal bridge is positioned in the recess to move based on a movement of the terminal.

8. The robot of claim 6, wherein the terminal bridge is coupled a side surface of the terminal.

9. The robot of claim 1, wherein the charging module further includes a spring provided between an upper surface of the terminal and a lower surface of the upper housing.

10. The robot of claim 9, wherein the spring provides an elastic force that returns the terminal to an initial position relative to the lower housing after the terminal is rotated and moved vertically.

11. The robot of claim 10, wherein an end of the spring is inserted into a recess formed in an upper surface of the terminal.

12. The robot of claim 1, wherein the robot moves to dock with the charging station, and the charging station provide the electrical energy to the terminal when the robot docks with the charging station.

13. The robot of claim 12, wherein the charging station includes:
an installation plate positioned on a travel surface of the robot; and
a terminal connecting region protruding outward from the installation plate, an upper surface of the terminal connecting region being recessed to receive and seat a surface of the terminal.

14. The robot of claim 13, wherein the terminal connecting region further includes an inclined guide surface provided at an end of the terminal connecting region, the inclined guide surface being configured to guide the terminal to the upper surface of the terminal connecting region.

15. The robot of claim 12, wherein the charging station further includes:
a case extending upward from the installation plate; and
a reflective surface provided on the case, wherein the robot moves to dock with the charging station based on detecting the reflective surface.

16. A robot comprising:
a body;
a plurality of wheels coupled to the body, one or more of the plurality of wheels receiving a driving force to move the robot;
a support plate disposed at a lower end in the body and coupled to the plurality of wheels; and
a charging module coupled to the support plate, the charging module including a terminal positioned forward of the plurality of wheels and extending downward below the support plate,
wherein a charging station provides electrical power to the terminal when the robot docks with the charging station,
wherein the charging module further includes:
an upper housing coupled to the support plate; and
a lower housing coupled to a lower region of the upper housing and having an internal space that opens downward,
wherein the terminal is inserted into the internal space of the lower housing so that a portion of the terminal is exposed to an exterior of the robot below the lower housing, and
wherein a width of the internal space of the lower housing is greater than a width of the terminal in order for the terminal to selectively rotate and move vertically relative to the lower housing in the internal space of the lower housing.

17. The robot of claim 16, wherein the charging station includes a reflective plate, and
wherein the robot further comprises a sensor that determines a position of the charging station based on detecting the reflective plate.

18. The robot of claim 16, wherein the charging station includes:
an installation plate provided on a travel surface of the robot, the installation plate having an upper surface that is positioned lower than a lower surface of the body from which the terminal extends; and
a terminal connecting region extending from an end of the installation plate and being selectively brought in contact with the terminal when the robot docks with the charging station, wherein one of the wheels is positioned to contact the end of the installation plate to stop a forward movement of the robot and to position the terminal to contact the terminal connecting region.

19. The robot of claim 18, wherein the terminal includes a front surface that is upwardly inclined from a bottom of the front surface, the terminal being rotated upward when the front surface comes in contact with an end of the terminal connecting region when the robot is docking with the charging station.

* * * * *